(12) United States Patent
Lin et al.

(10) Patent No.: US 11,101,734 B2
(45) Date of Patent: Aug. 24, 2021

(54) MULTI-LEVEL BUCK CONVERTER CAPABLE OF REDUCING COMPONENT STRESS

(71) Applicant: National Taiwan University of Science and Technology, Taipei (TW)

(72) Inventors: Jing-Yuan Lin, New Taipei (TW); Jun-Ru Wang, New Taipei (TW); Pin-Hsien Liu, Changhua County (TW); Huang-Jen Chiu, New Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 16/817,735

(22) Filed: Mar. 13, 2020

(65) Prior Publication Data
US 2021/0159795 A1 May 27, 2021

(30) Foreign Application Priority Data
Nov. 26, 2019 (TW) .................. 108142895

(51) Int. Cl.
*H02M 3/158* (2006.01)
*H02M 1/00* (2006.01)
*H02M 1/34* (2007.01)

(52) U.S. Cl.
CPC ............. *H02M 3/158* (2013.01); *H02M 1/00* (2013.01); *H02M 3/1584* (2013.01); *H02M 1/0009* (2021.05); *H02M 1/0048* (2021.05); *H02M 1/34* (2013.01); *H02M 1/342* (2021.05)

(58) Field of Classification Search
CPC ......... H02M 3/158; H02M 2001/0009; H02M 2001/0048; H02M 1/34; H02M 2001/342; H02M 1/10
See application file for complete search history.

(56) References Cited

U.S. PATENT DOCUMENTS

| | | | |
|---|---|---|---|
| 2016/0190921 A1* | 6/2016 | Kumar | H02M 3/07 323/271 |
| 2020/0161959 A1* | 5/2020 | Chuang | H02M 3/07 |
| 2020/0177073 A1* | 6/2020 | Davidson | H02M 3/33569 |
| 2020/0266771 A1* | 8/2020 | Britz | H03F 3/2171 |

\* cited by examiner

*Primary Examiner* — Rafael O De Leon Domenech
(74) *Attorney, Agent, or Firm* — Li & Cai Intellectual Property (USA) Office

(57) ABSTRACT

A multi-level buck converter includes an input power source, an input capacitor, first to fourth switches, a clamp capacitor, an output inductor, a clamp switch, a clamp diode, an output capacitor, an output load, a current detection circuit, a voltage detection circuit and a control circuit. The current detection circuit detects whether an inductor current of the output inductor exceeds a predetermined current value, and if so, the output clamp signal controls the clamp switch to be turned on. The voltage detection circuit generates a duty cycle control signal according to an error between an output voltage and a target output voltage. The control circuit controls the first to the fourth switches to sequentially enter a first mode, a second mode, a third mode, and a fourth mode in a first part of a duty cycle.

6 Claims, 14 Drawing Sheets

MULTI-LEVEL BUCK CONVERTER CAPABLE OF REDUCING COMPONENT STRESS

CROSS-REFERENCE TO RELATED PATENT APPLICATION

This application claims the benefit of priority to Taiwan Patent Application No. 108142895, filed on Nov. 26, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a multi-level buck converter, and more particularly to a multi-level buck converter capable of reducing component stress, difficulty in selecting switches, and circuit losses.

BACKGROUND OF THE DISCLOSURE

Conventional power converters are gradually developing towards high voltage and high power. In addition to an issue of voltage stresses, costs of the components must also be considered in the selection of power components, power components capable of withstanding high voltage are not only few in number, but also have a more expensive price.

In the early days, power components used in high-power and high-voltage circuits were mainly insulated gate bipolar transistors (IGBTs) or silicon controlled rectifiers (SCRs). Although these power components have advantages of high voltage resistance and high current resistance, switching frequencies thereof are limited, thereby causing large losses. Therefore, a method of improving on losses by using a metal-oxide semiconductor field effect transistor (MOSFET) or silicon carbide has been proposed, but the associated cost is higher, and thus a concept for applying a multi-level architecture to the converters so as to reduce voltage stress was proposed.

However, in order to achieve the multi-level architecture, the number of components needs to be increased, and in order to balance the cross-voltage on each component, the control method becomes complicated, and the reliability also decreases as the level increases.

Therefore, there is a great need for a multi-level converter that can reduce component stress, difficulty in selecting switches, and circuit losses.

SUMMARY OF THE DISCLOSURE

In response to the above-referenced technical inadequacies, the present disclosure provides a multi-level buck converter capable of reducing component stress, difficulty in selecting switches, and circuit losses.

In one aspect, the present disclosure provides a multi-level buck converter including an input power source, an input capacitor, first to fourth switches, a clamp capacitor, an output inductor, a clamp switch, a clamp diode, an output capacitor, an output load, a current detection circuit, a voltage detection circuit and a control circuit. The input capacitor is connected in parallel with the input power with respect to a first node and a second node. The first switch has one end connected to the first node. The second switch has one end connected to another end of the first switch. The third switch has one end connected to another end of the second switch. The fourth switch is connected between another end of the third switch and the second node. The clamp capacitor is connected between the another end of the first switch and the another end of the third switch. The output inductor has one end connected to a third node between the second switch and the third switch, and another end connected to an output node. The clamp switch has one end connected to the third node. The clamp diode is connected between another end of the clamp switch and the output node. The output capacitor is connected between the output node and the second node. The output load is connected between the output node and the second node, and connected in parallel with the output capacitor, the current detection circuit is configured to detect whether an inductor current of the output inductor exceeds a predetermined current value. In response to the inductor current exceeding the predetermined current, the current detection circuit is configured to output a clamp signal to control the clamp switch to be turned on. The voltage detection circuit is configured to receive an output voltage and a reference voltage of the output node, and generate a duty cycle control signal according to an error between the output voltage and a target output voltage. The duty cycle control signal is used to indicate a duty cycle. The control circuit is configured to receive the duty cycle control signal and control the first switch to the fourth switch in a first part of the duty cycle to sequentially enter a first mode, a second mode, a third mode and a fourth mode. In the first mode, the control circuit is configured to control the first switch, the third switch to be turned on, and control the second switch and the fourth switch to be turned off. The control circuit is configured to, in response to entering the second mode from the first mode, control the first switch to be turned off. The control circuit is configured to, in response to entering the third mode from the second mode, control the fourth switch to be turned on. The control circuit is configured to, in response to entering the fourth mode from the third mode, control the third switch to be turned off.

Therefore, the multi-level buck converter provided by the present disclosure can reduce half of the stress of the components through a multi-level architecture and reduce the difficulty in selecting switches, and a clamping triangle current control method is also utilized to reduce circuit losses under light load conditions.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
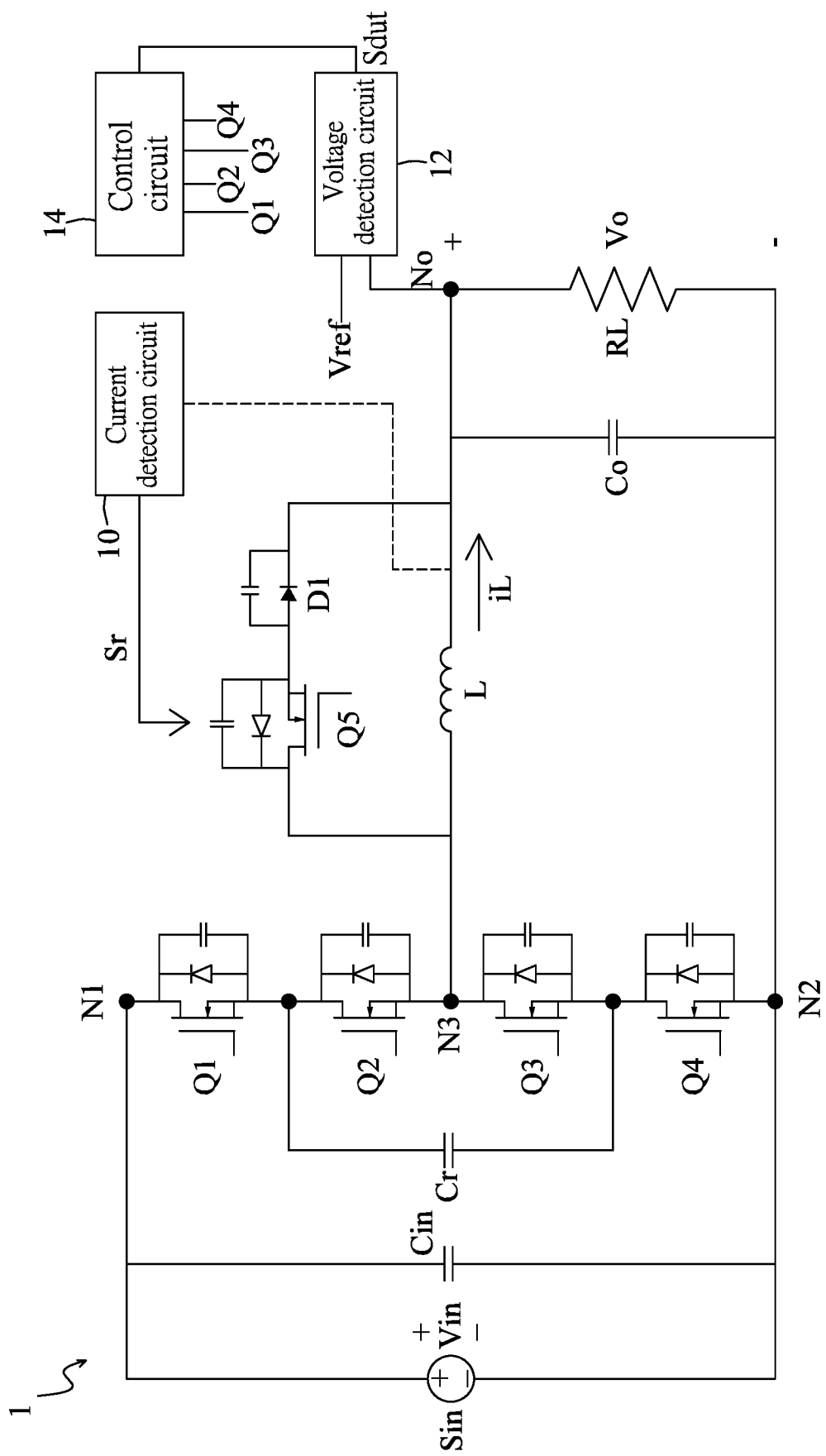
FIG. 1 is a circuit architecture diagram of a multi-level buck converter according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit architecture diagram of a multi-level buck converter according to the present disclosure. As shown in FIG. 1, an embodiment of the present disclosure provides a multi-level buck converter 1 including an input power source Sin, an input capacitor Cin, a first switch Q1, a second switch Q2, a third switch Q3, a fourth switch Q4, a clamp capacitor Cr, an output inductor L, a clamp switch Q5, a clamp diode D1, an output capacitor Co, an output load RL, a current detection circuit 10, a voltage detection circuit 12, and a control circuit 14.

As shown in FIG. 1, the input capacitor Cin and the input power Sin are connected in parallel with respect to the first node N1 and the second node N2, and the input power Sin has an input voltage Vin, which can be a stable DC value. One end of the first switch Q1 is connected to the first node N1, and one end of the second switch Q2 is connected to another end of the first switch Q1. One end of the third switch Q3 is connected to another end of the second switch Q2. The fourth switch Q4 is connected between another end of the third switch Q3 and the second node N2.

The clamp capacitor Cr is connected between the another end of the first switch Q1 and the another end of the third switch Q3. One end of the output inductor L is connected to the third node N3 between the second switch Q2 and the third switch Q3, and another other end of the output inductor L is connected to the output node No. In the present embodiment, the input capacitance Cin and the clamp capacitance Cr are extremely large, and can be regarded as ideal voltage sources.

One end of the clamp switch Q5 is connected to the third node N5, and the clamp diode D1 is connected between another end of the clamp switch Q5 and the output node No. The output capacitor Co is connected between the output node No and the second node N2. The first switch Q1, the second switch Q2, the third switch Q3, the fourth switch Q4, and the clamp switch Q5 can be power switches, and can be, for example, silicon carbide-metal oxide semiconductor field effect transistors (SiC-MOSFETs). The output load RL is connected between the output node No and the second node N2 and is connected in parallel with the output capacitor Co.

It should be noted that the multi-level buck converter 1 of the present disclosure mainly operates in a clamp switch triangular current mode, which is also called a CL-TCM control method. Specifically, when the output inductor current iL drops to a condition where the power switch achieves zero voltage switching, the clamp switch Q5 connected in parallel with the output inductor L is turned on, and an inductor current iL is clamped on a path formed by the clamp switch Q5 until a next cycle is started.

This switching technology is similar to a TCM control method. The output inductor L has a lower effective value current under light load conditions, and thus the efficiency is higher than the traditional SCM control mode. Furthermore, the present disclosure is further provided with the current detection circuit 10 for detecting whether the inductor current iL of the output inductor L exceeds a predetermined current value, and in response to the inductor current iL exceeding the predetermined current, the current detection circuit 10 is configured to output a clamp signal Sr to control the clamp switch Q5 to be turned on. In this way, the inductor current iL can be clamped at a reverse current value sufficient to achieve zero voltage switching. Since the CL-TCM mode and the SCM control mode have the same switching frequencies, advantages of the TCM control mode can be achieved without changing the switching frequency, thereby reducing difficulty of digital control and designing EMI filters in much simpler way.

In addition, the multi-level buck converter 1 further includes a voltage detection circuit 12 configured to receive an output voltage Vo of the output node No and a reference voltage Vref, and generate a duty cycle control signal Sdut according to an error between the output voltage Vo and a target output voltage. The duty cycle control signal Sdut is mainly used to indicate the duty cycle of the multi-level buck converter 1 during operation.

The control circuit 14 is configured to receive the duty cycle control signal Sdut, and control the first to fourth switches in a first part of the duty cycle to sequentially enter a first mode, a second mode, a third mode, and a fourth mode. Description will be made below with reference to FIGS. 2 and 3A to 3I.

Figure 2:
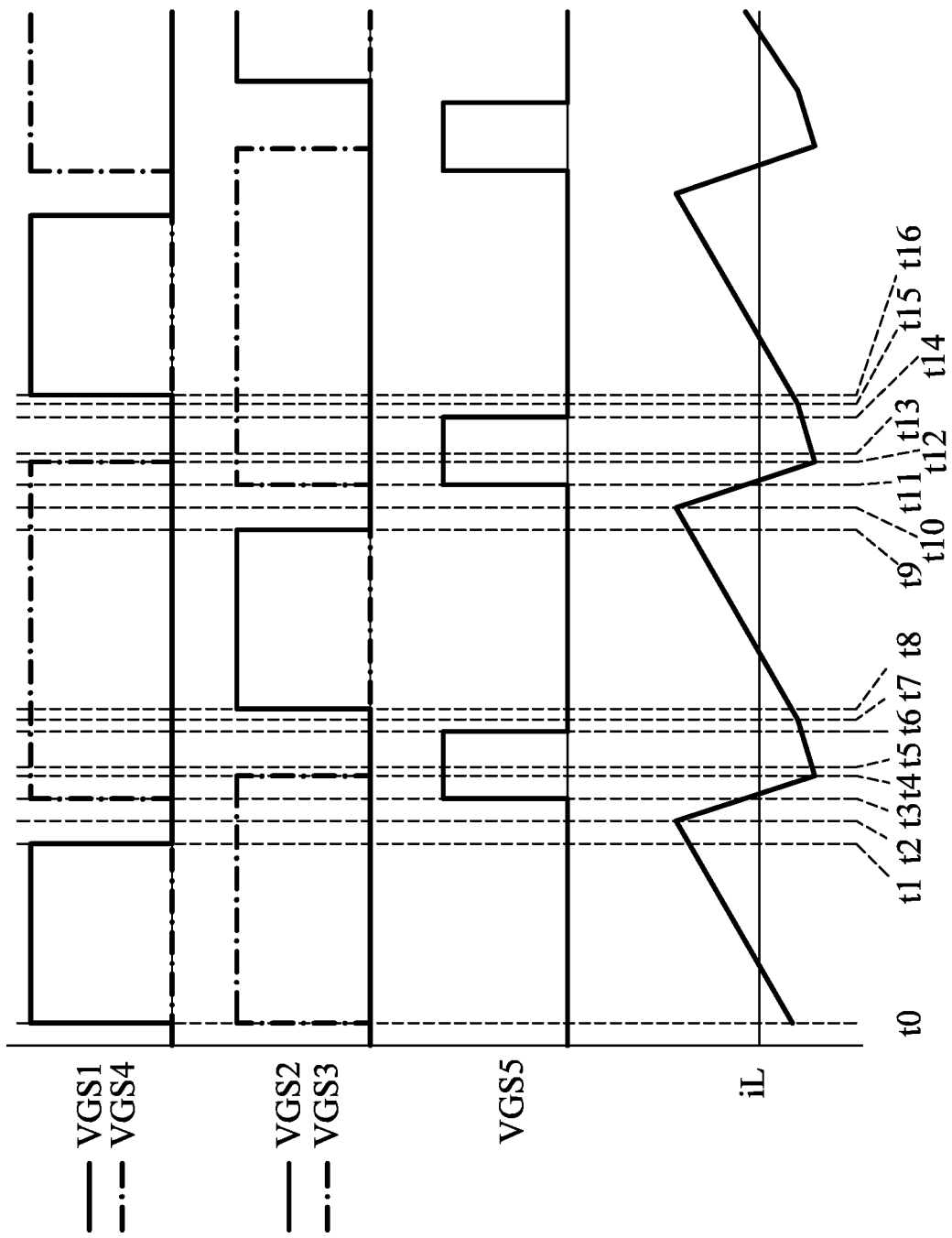
FIG. 2 is an operation timing diagram under light load conditions of the multi-level buck converter according to an embodiment of the present disclosure.

FIG. 2 is an operation timing diagram under light load conditions of the multi-level buck converter according to an embodiment of the present disclosure, and FIG. 3A to FIG. 3I are schematic diagrams of conduction paths of phases 1 to 9 of the multi-level buck converter according to the embodiment of the present disclosure.

In the embodiment of the present disclosure, a CL-TCM buck converter is divided into two modes of light load and heavy load for analysis. FIG. 2 shows signal waveforms under light load conditions of the CL-TCM mode, FIG. 2 includes switch driving signals VGS1, VGS2, VGS3, VGS4 for controlling the first switch Q1 to the fourth switch Q4, respectively, and a switch driving signal VGS5 for controlling the clamp switch Q5. In the present embodiment, the switch driving signals VGS1 and VGS4 are complementary to the switch driving signals VGS2 and VGS3, respectively, and the switch driving signals VGS1 and VGS2 have a phase difference of 180 degrees. The signal waveforms mentioned above also includes the inductor current iL.

In detail, a multi-level CL-TCM buck converter can be divided into 18 phases in a single duty cycle, as shown as times t0 to t16, and energy storage for the output inductor L is repeated twice. In order to simplify interval analysis, hypotheses are proposed as follows:

Firstly, power switches (such as the first switch Q1 to the fourth switch Q4, and the clamp switch Q5) only consider parasitic capacitances and turn-on voltages of body diodes.

Secondly, capacitances of the input capacitor Cin and the clamping capacitor Cr are extremely large, and can be regarded as ideal voltage sources.

Thirdly, the input voltage Vin of the input power source Sin is a stable DC value.

Fourthly, the parasitic capacitances and the body diodes of all power switches (such as the first switch Q1 to the fourth switch Q4 and the clamp switch Q5) are the same.

Fifthly, the remaining components in the circuit are ideal without any losses.

Figure 3A:
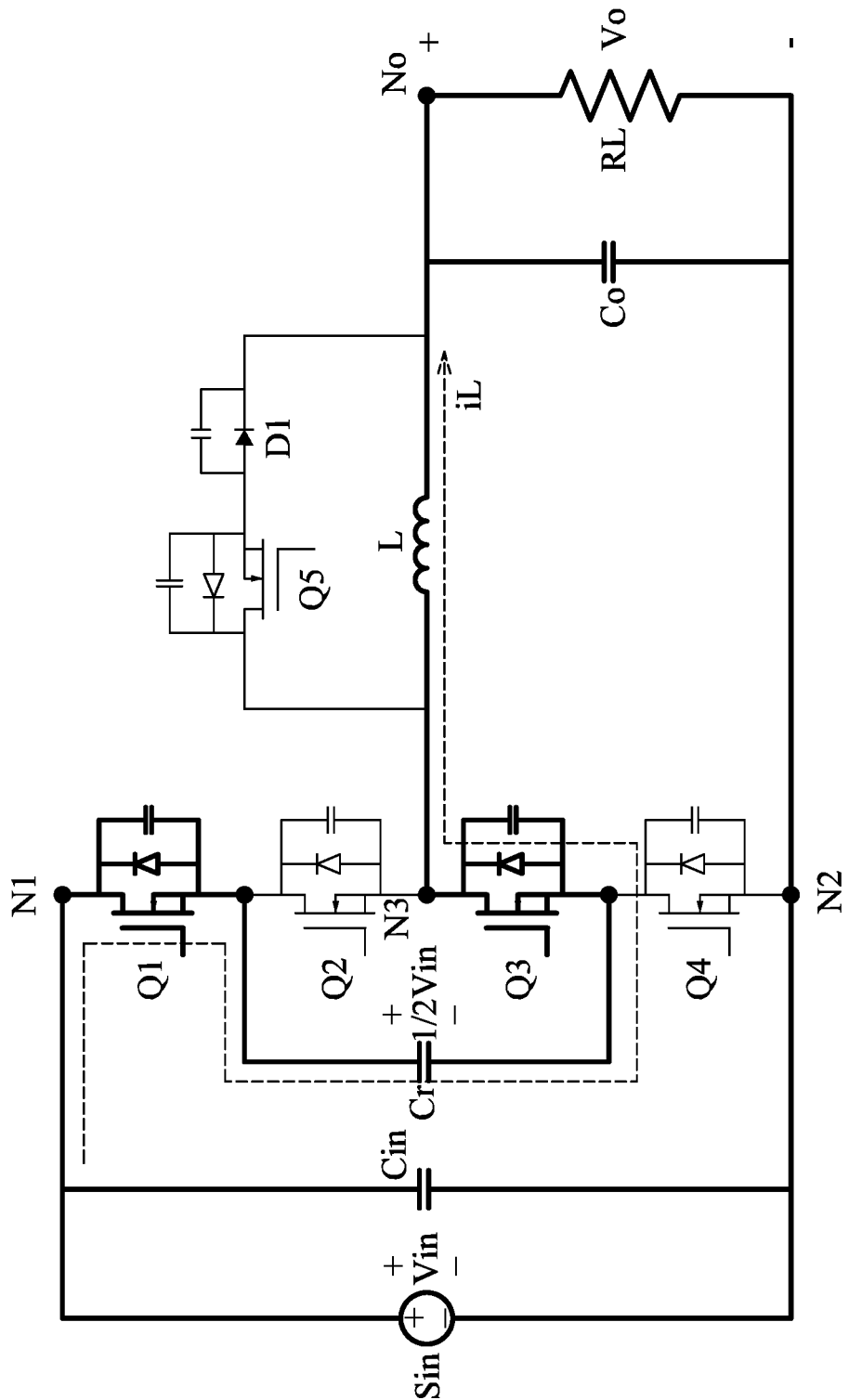
FIG. 3A to FIG. 3I are schematic diagrams of conduction paths of phases 1 to 9 of the multi-level buck converter according to the embodiment of the present disclosure.

Phase 1 (time t0-time t1):

As shown in FIG. 3A, at time t0, the first switch Q1 is turned on, the second switch Q2 is turned off, the third switch Q3 is turned on, and the fourth switch Q4 is turned off. At this time, the clamp switch Q5 is not turned on. Therefore, the inductor current iL rises linearly and a current flow direction of the inductor current iL changes from negative to positive during this phase.

Figure 3B:
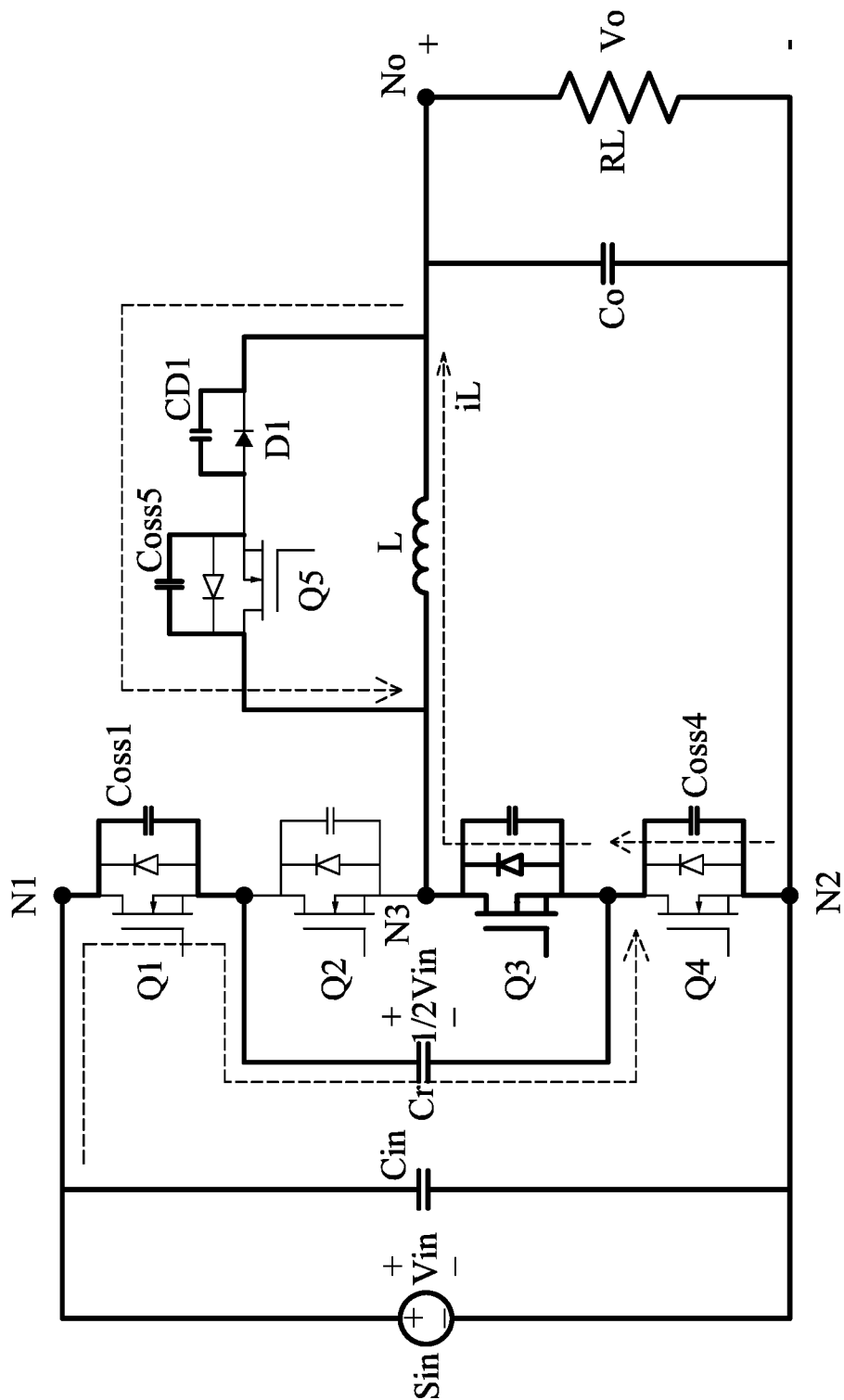

Phase 2 (time t1-time t2):

As shown in FIG. 3B, at time t1, the first switch Q1 is switched from ON to OFF, and the second switch Q2, the third switch Q3, and the fourth switch Q4 remain unchanged. At this time, in order to maintain the continuity of the inductor current iL, when the first switch Q1 and the fourth switch Q4 remain turned off, the parasitic capacitance Coss1 of the first switch Q1 is charged, and the parasitic capacitance Coss4 of the fourth switch Q4 is discharged. The clamp switch Q5 charges the parasitic capacitance Coss5 due to the flow direction of the inductor current iL, and the parasitic capacitance CD1 of the clamp diode D1 is discharged. This phase ends when the parasitic capacitance of the fourth switch Q4 is discharged to a conduction voltage of the body diode DQ4.

Figure 3C:
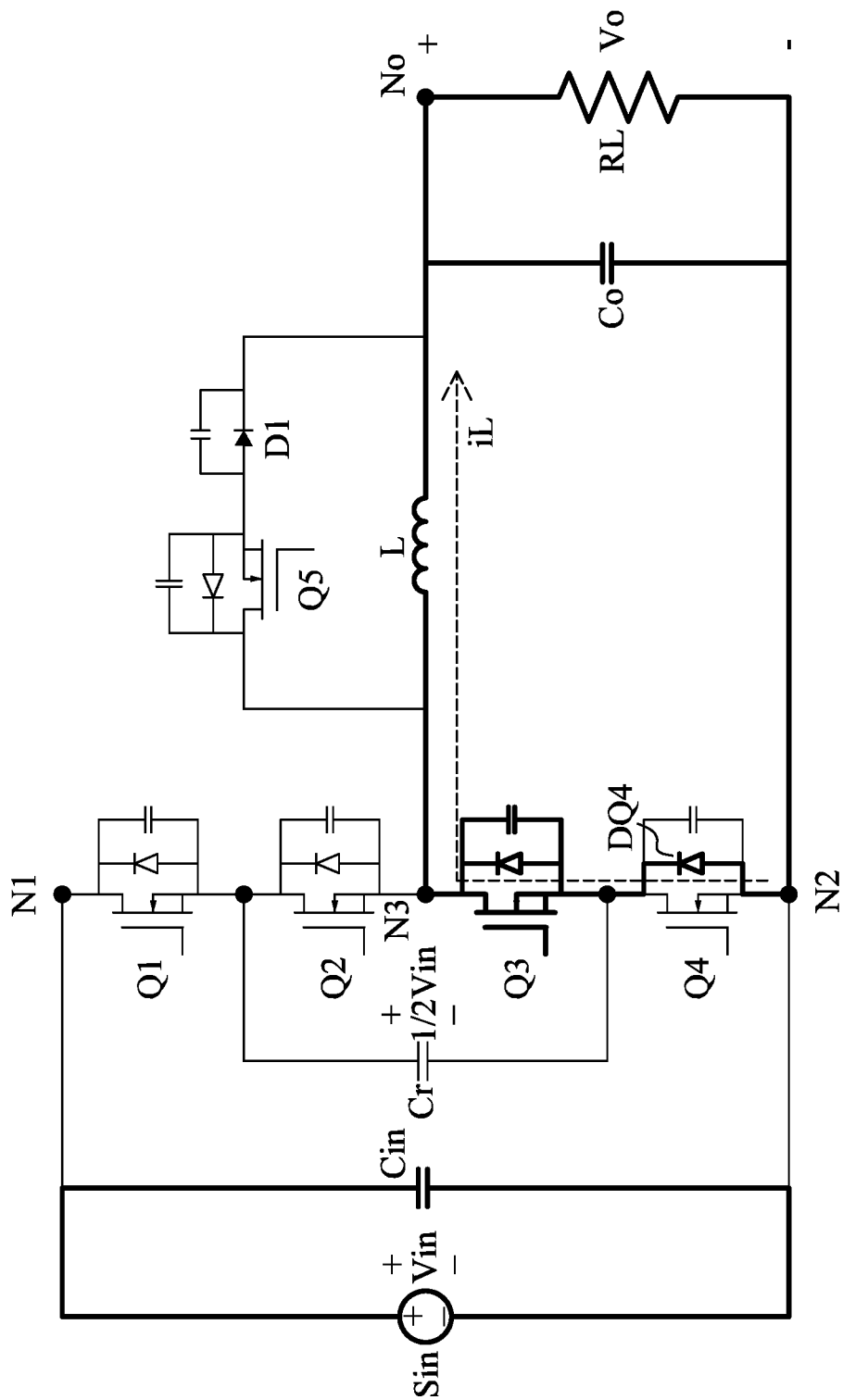

Phase 3 (time t2-time t3):

As shown in FIG. 3C, at time t2, the first switch Q1, the second switch Q2, and the fourth switch Q4 remain turned off Since the parasitic capacitance Coss4 of the fourth switch Q4 is discharged until the body diode DQ4 is conducted in the previous phase, the inductor current iL decreases linearly at this time.

Figure 3D:
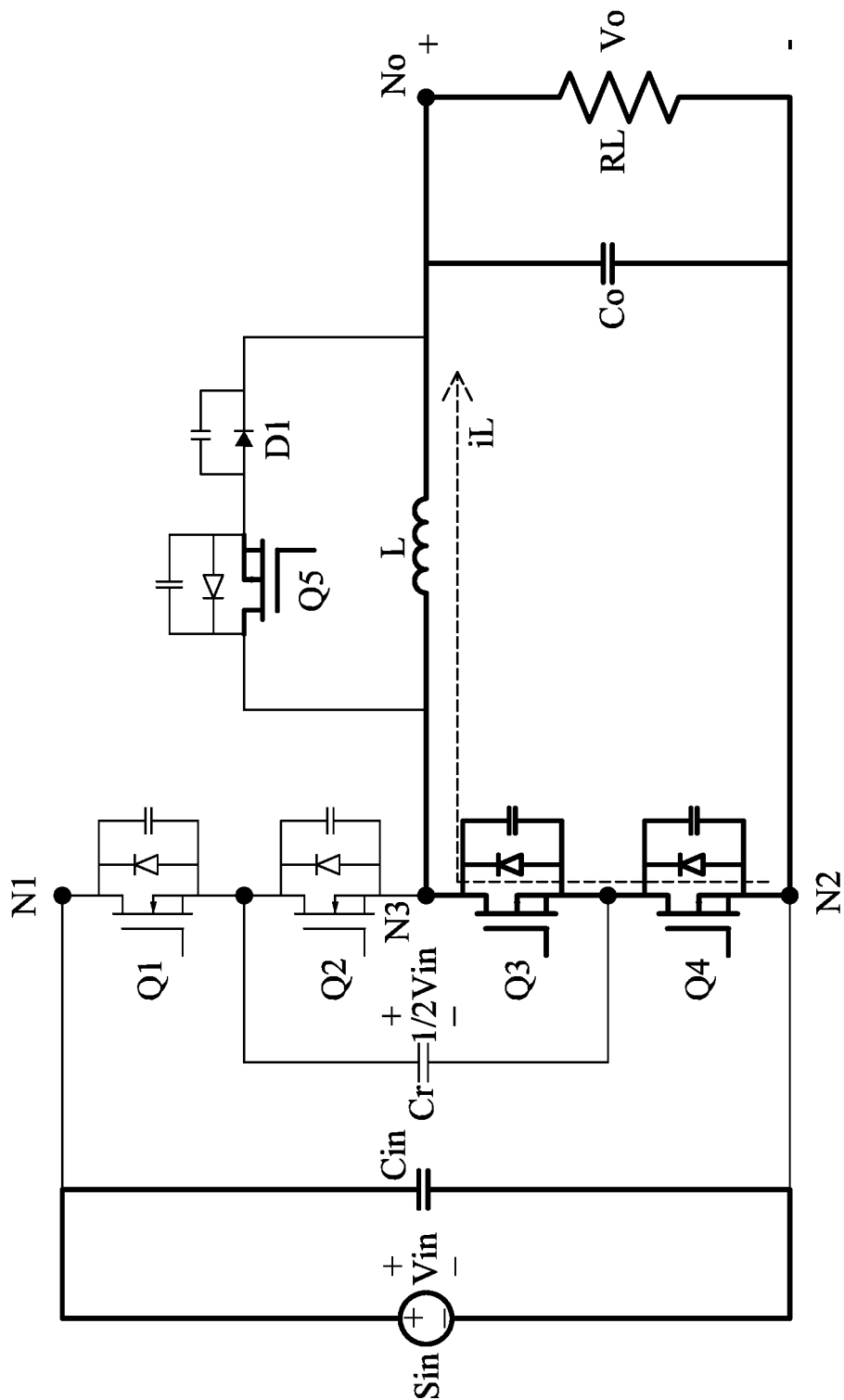

Phase 4 (time t3-time t4):

As shown in FIG. 3D, at time t3, the fourth switch Q4 is switched from OFF to ON, and the current detection circuit 12 detects that the inductor current iL linearly decreases to a predetermined current value, thereby causing the clamp switch Q5 to be turned on, and the first switch Q1 and the second switch Q2 remain turned off. However, since the clamp diode D1 is cut-off in the reverse direction, the clamp circuit of the output inductor L does not operate. The inductor current iL decreases linearly at this phase.

Figure 3E:
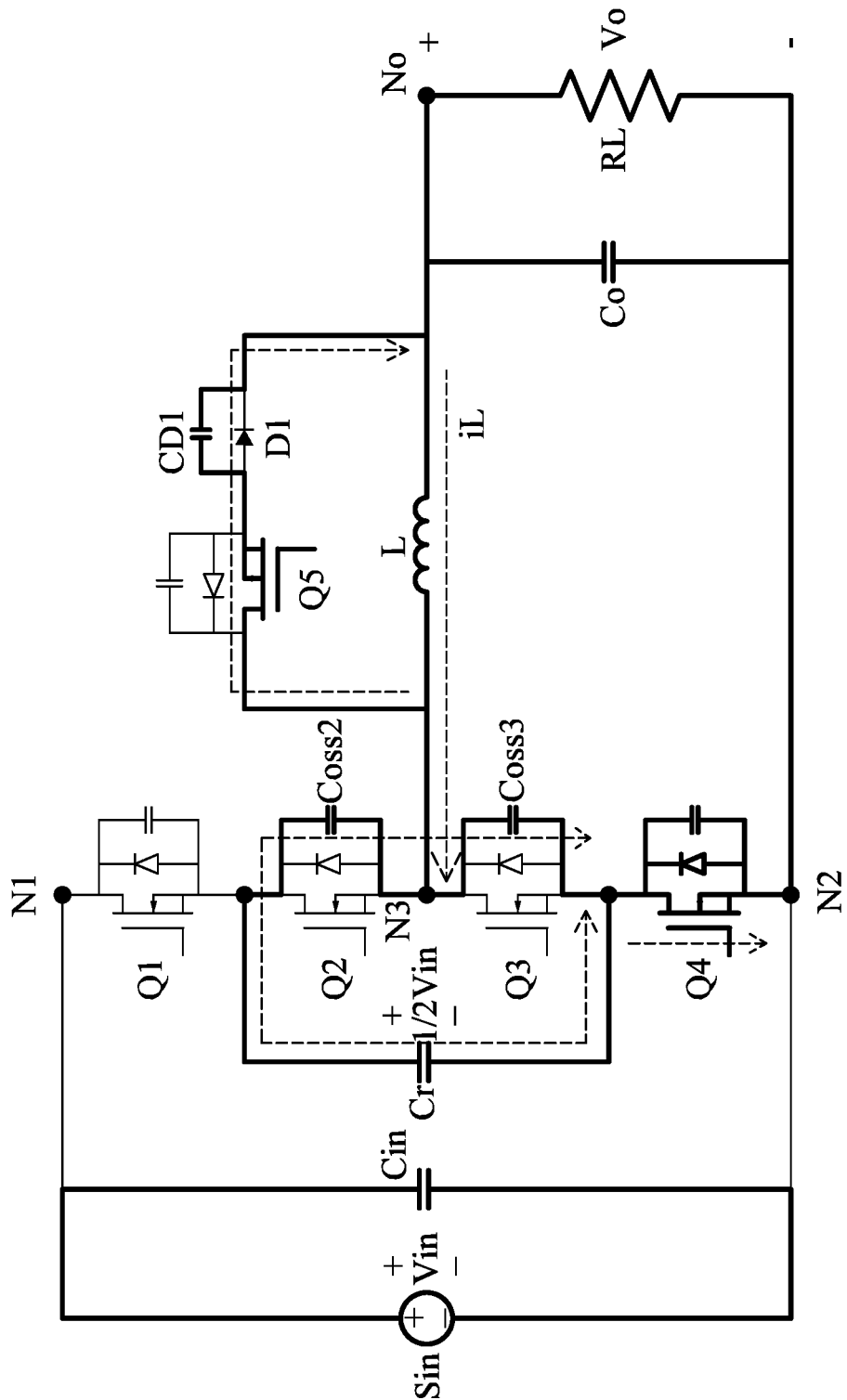

Phase 5 (time t4-time t5):

As shown in FIG. 3E, at time t4, the third switch Q3 is switched from ON to OFF, and the clamp switch Q5 remains turned on. Because the direction of the inductor current iL in the previous phase is reversed, the inductor current iL at this phase charges the parasitic capacitance Coss2 of the second switch Q2 and discharges the parasitic capacitance Coss3 of the third switch Q3. A parasitic capacitance CD1 of the clamped diode D1 also flows in the current at this stage, and is discharged under the condition that the fourth switch Q4 remains turned on. This stage ends when the clamping diode D1 is conducted by the discharging of the parasitic capacitance CD1 of the clamping diode D1.

Figure 3F:
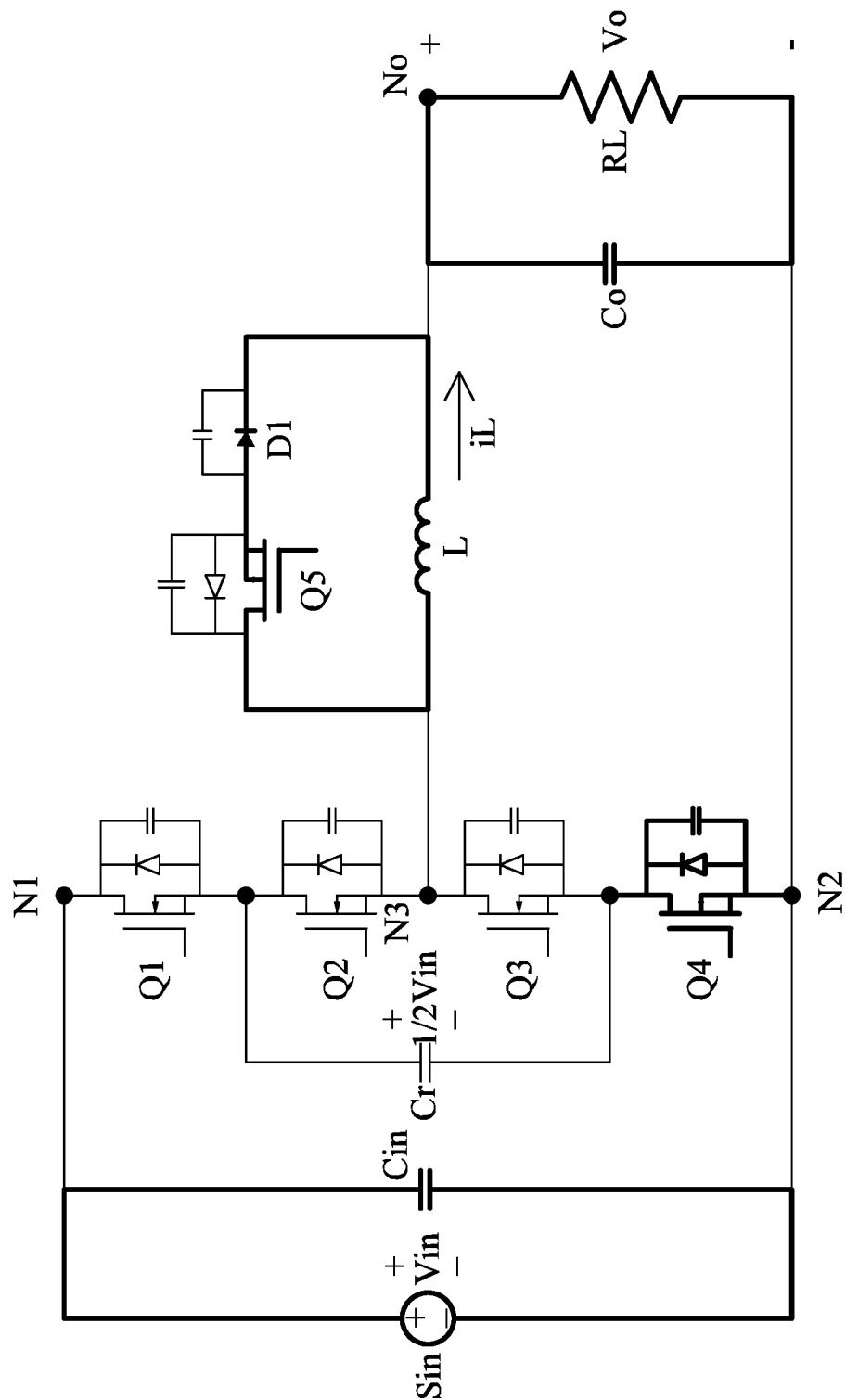

Phase 6 (time t5-time t6):

As shown in FIG. 3F, at time t5, the first switch Q1, the second switch Q2, and the third switch Q3 are turned off, and the clamp switch Q5 remains turned on. Since the clamp diode D1 is turned on in the previous phase, the inductor current iL of the output inductor L is circulated between the clamp switch Q5 and the clamp diode D1.

Figure 3G:
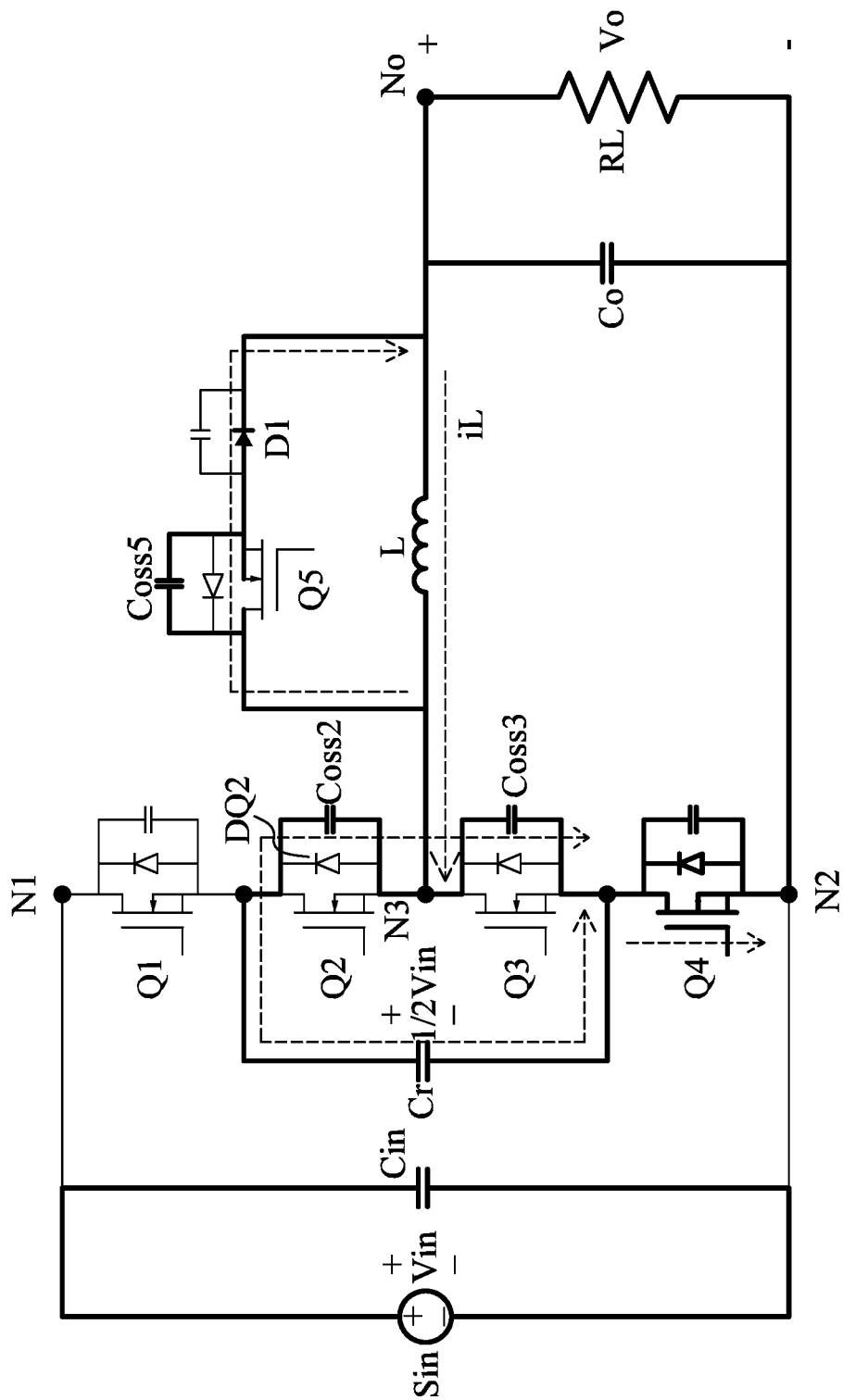

Phase 7 (time t6-time t7):

As shown in FIG. 3G, at time t6, since the current detection circuit 10 detects that the inductor current iL does not exceed the predetermined current value, the control switch Q5 is turned off Since the inductor current iL is continuously maintained, when the second switch Q2 and the third switch Q3 remain turned off, the parasitic capacitance Coss2 of the second switch Q2 is charged, the parasitic capacitance Coss3 of the third switch Q3 is discharged, and the parasitic capacitance Coss5 of the clamp switch Q5 is charged. This phase ends when the parasitic capacitance Coss2 of the second switch Q2 is discharged until the body diode DQ2 is conducted.

Figure 3H:
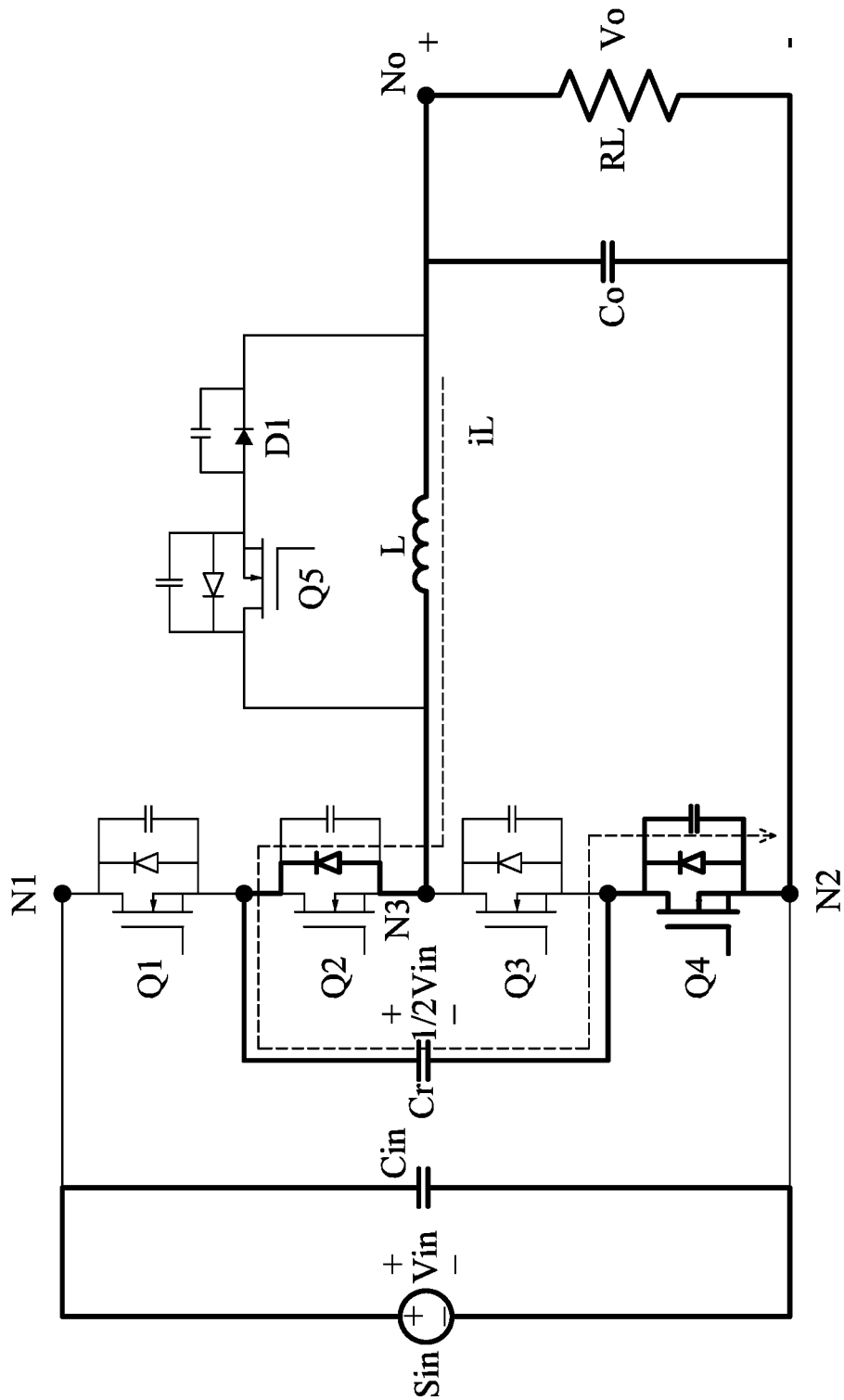

Phase 8 (time t7-time t8):

As shown in FIG. 3H, at time t7, the first switch Q1, the second switch Q2, the third switch Q3, and the clamp switch Q5 remain turned off Since the parasitic capacitance Coss2 of the second switch Q2 is discharged in the previous phase until the body diode DQ2 is conducted, the inductor current iL rises linearly.

Figure 3I:
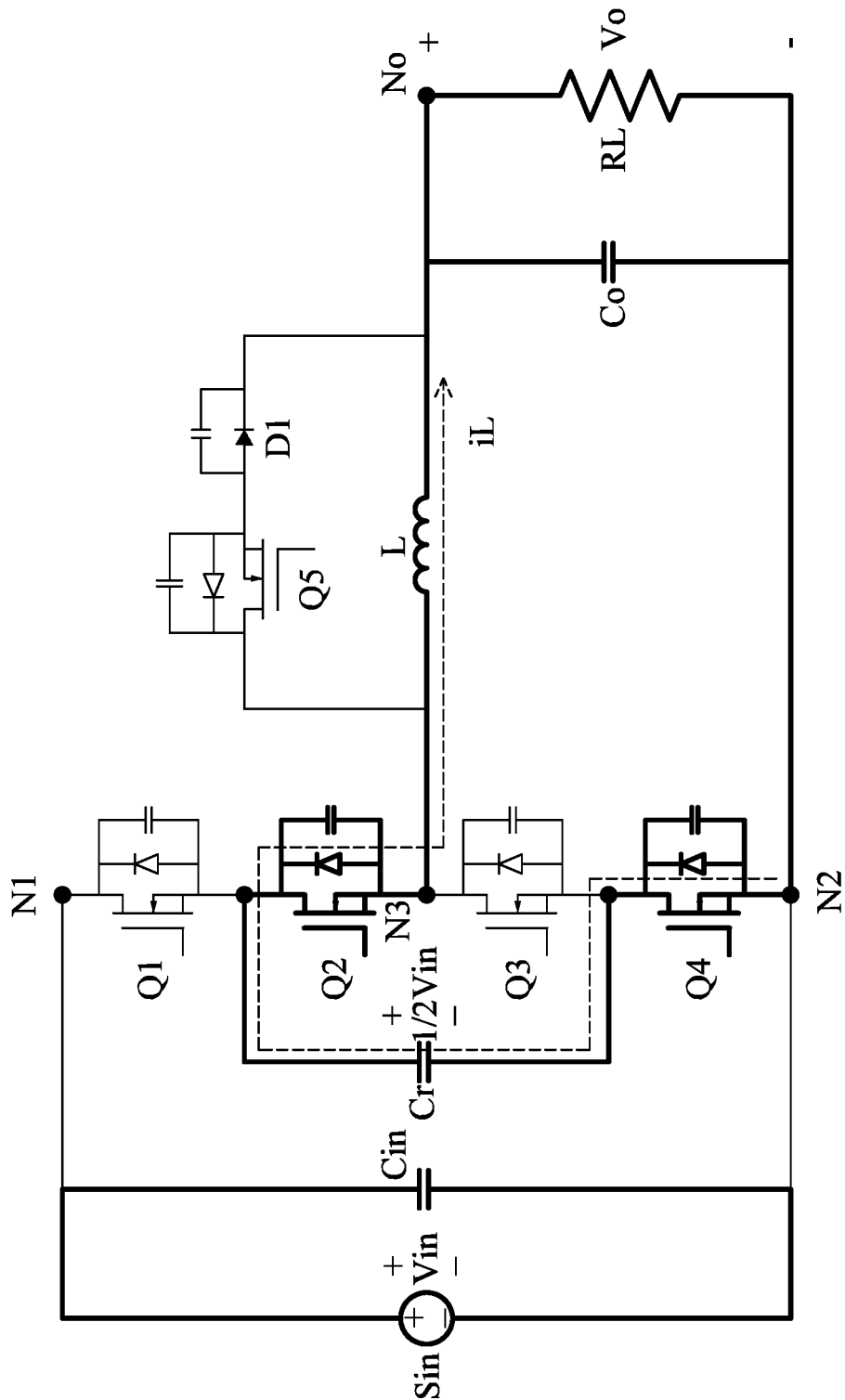

Phase 9 (time t8-time t9):

As shown in FIG. 3I, at time t8, the second switch Q2 is switched from OFF to ON, and the first switch Q1, the third switch Q3, and the fourth switch Q4 remain the same as in the eighth phase. At this time, since the clamp switch Q5 is not turned on, the inductor current iL rises linearly and changes from negative to positive in the present phase.

Further, from time t9 to time t16, the above-mentioned stage 1 to stage 9 are repeated, and thus the repeated descriptions are omitted.

After sorting the above switching states, it can be seen that in the first part of the duty cycle, the control circuit 14 controls the first to fourth switches Q1 to Q4 to operate in four modes. In the first mode, the control circuit 14 controls the first switch Q1 and the third switch Q3 to be turned on, and controls the second switch Q2 and the fourth switch Q4 to be turned off. In response to entering the second mode from the first mode, the control circuit 14 controls the first switch Q1 to be turned off. In response to entering the third mode from the second mode, the control circuit 14 controls the fourth switch Q4 to be turned on. In response to entering the fourth mode from the third mode, the control circuit 14 controls the third switch Q3 to be turned off.

TABLE I

| Time | Phase | Q1 | Q2 | Q3 | Q4 | Q5 | Mode |
|------|-------|-----|-----|-----|-----|-----|------|
| t0-t1 | 1 | ON | OFF | ON | OFF | OFF | 1 |
| t1-t2 | 2 | OFF | OFF | ON | OFF | OFF | 2 |
| t2-t3 | 3 | OFF | OFF | ON | OFF | OFF | 2 |
| t3-t4 | 4 | OFF | OFF | ON | ON | ON | 3 |
| t4-t5 | 5 | OFF | OFF | OFF | ON | ON | 4 |
| t5-t6 | 6 | OFF | OFF | OFF | ON | ON | 4 |
| t6-t7 | 7 | OFF | OFF | OFF | ON | OFF | 4 |
| t7-t8 | 8 | OFF | OFF | OFF | ON | OFF | 4 |
| t8-t9 | 9 | OFF | ON | OFF | ON | OFF | |

According to the above process, the control circuit 14 further controls the first switch Q1 to the fourth switch Q4 to sequentially enter a fifth mode, a sixth mode, a seventh mode, and an eighth mode in a second part of the duty cycle. In the present embodiment, ON and OFF states of the first to the fourth switches Q1-Q4 in the first to the fourth modes are mutually exclusive with the ON and OFF states of the fifth mode to the eighth mode, respectively.

Figure 4:
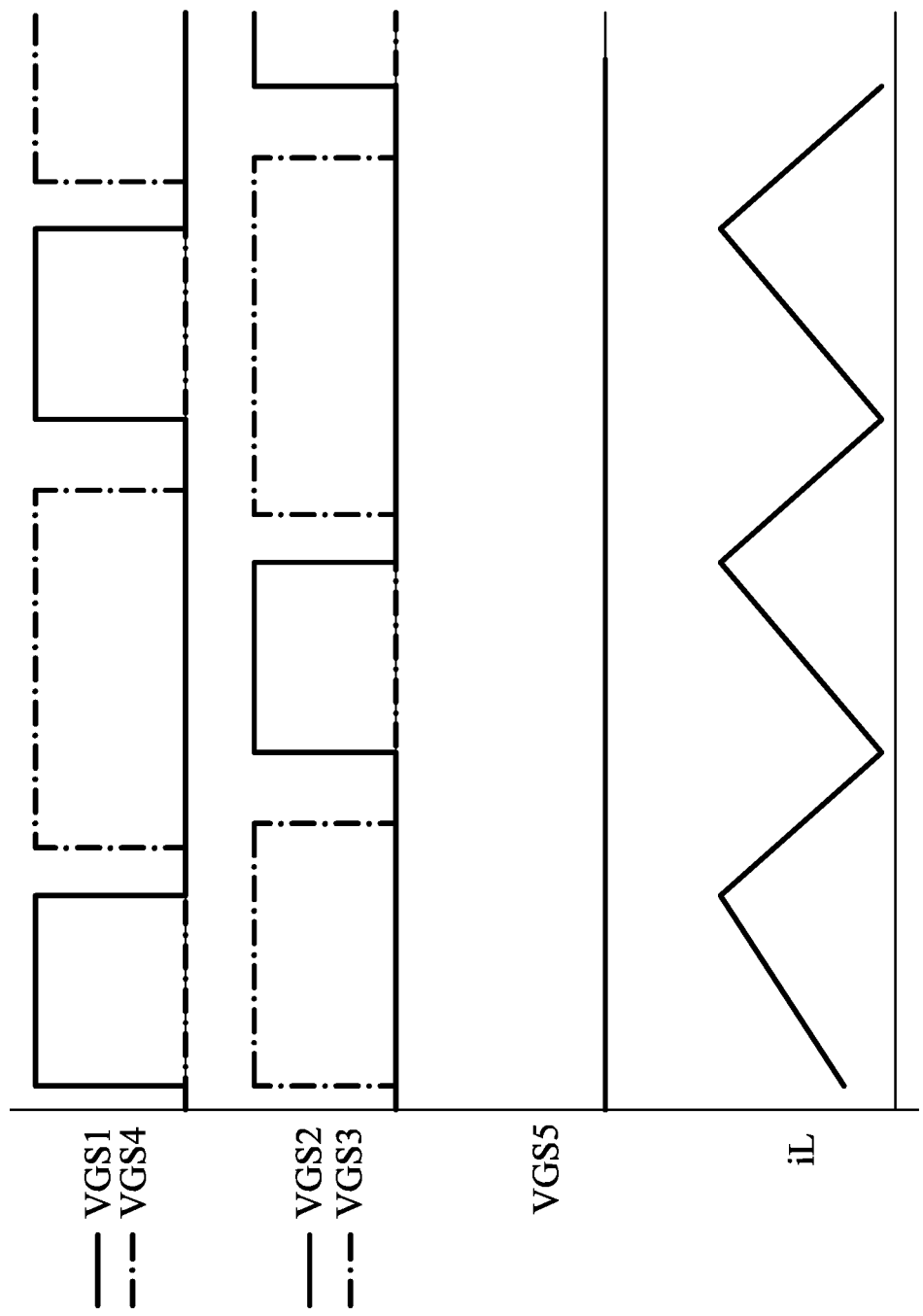
FIG. 4 is an operation timing diagram under heavy load of the multi-level buck converter according to an embodiment of the present disclosure.

FIG. 4 is an operation timing diagram under heavy load of the multi-level buck converter according to an embodiment of the present disclosure. The difference from the previous embodiment is that the multi-level buck converter of the present disclosure uses a negative peak current detection and a voltage compensator to achieve closed-loop control. Moreover, under heavy load conditions, the inductor current iL does not reach the predetermined negative current value as shown in FIG. 4, and thus the switch driving signal VGS5 used to control the clamp switch Q5 should theoretically be maintained at a low potential.

When the multi-level buck converter 1 operates under light load conditions, a negative current interval of the output inductor L is limited by the clamp circuit formed by the clamp diode D1 and the clamp switch Q5, which can reduce effective values of ripples on the output inductor L, thereby reducing converter losses. On the other hand, voltage stresses on the power switches, such as the first switch Q1 to the fourth switch Q4, are only half of the input voltage Vin, and thus component specifications selected for designing the converter can be lowered.

Figure 5:
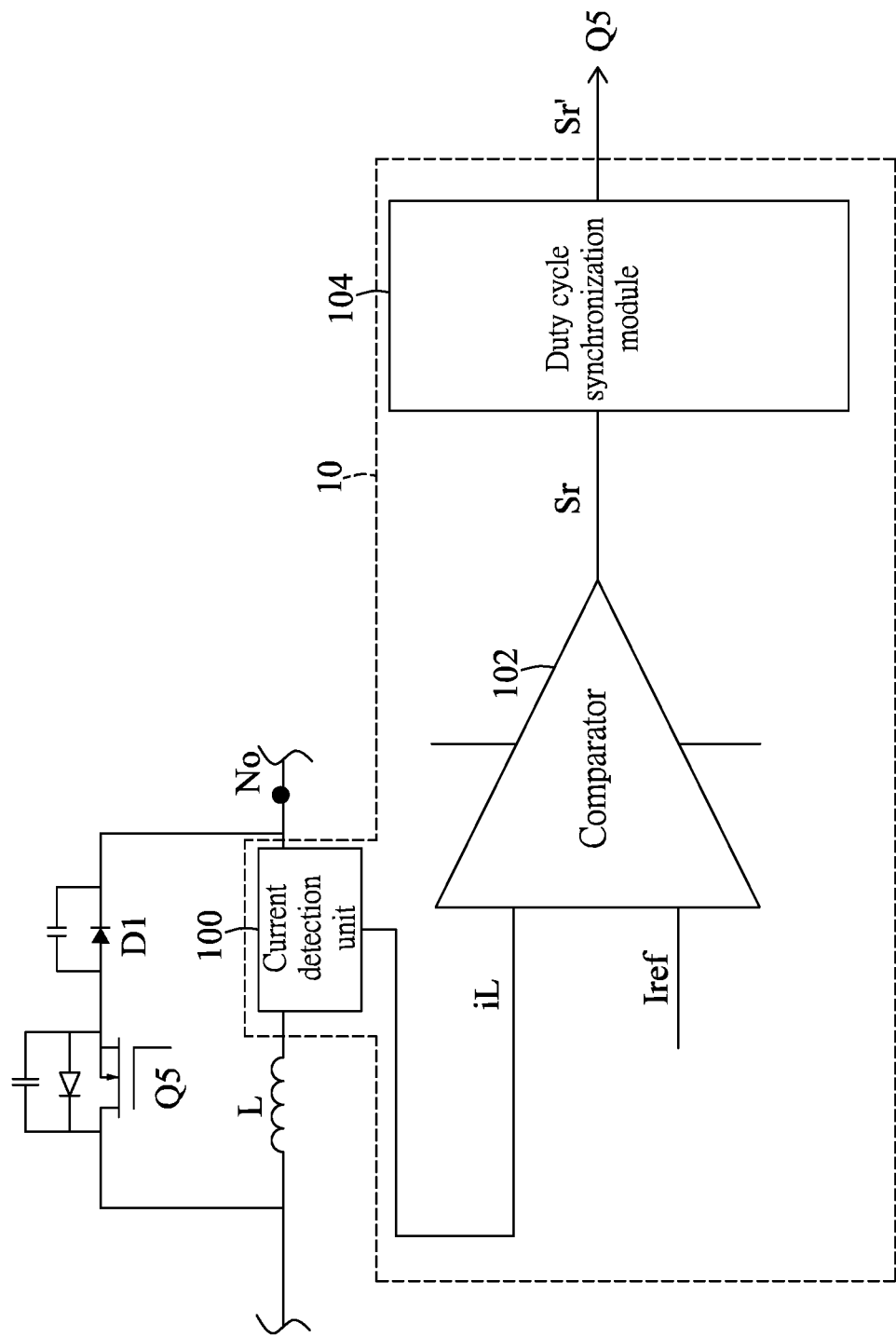
FIG. 5 is a circuit architecture diagram of a current detection circuit according to an embodiment of the present disclosure.

Reference is further made to FIG. 5, which is a circuit architecture diagram of a current detection circuit according to an embodiment of the present disclosure. In some embodiments, the current detection circuit 10 can include a current detection unit 100 and a comparator 102. The current detection unit 100 can be a Hall sensor connected between the output inductor L and the output node No, and configured to detect the inductor current iL. A first input terminal of the comparator 102 receives an inductor current iL, and a second input terminal of the comparator 102 receives a reference current Iref. The comparator 102 is configured to compare the inductor current iL with a reference current Iref to determine whether the inductor current iL exceeds a predetermined current value. In response to the inductor current iL exceeding the predetermined current value, the comparator outputs the clamp signal Sr at an output terminal of the comparator 102 to control the clamp switch Q5 to be turned on.

Furthermore, the current detection circuit 10 can further include an analog-to-digital converter to convert the inductor current iL and the reference current Iref into digital signals. For example, the comparator 102 can be, for example, a digital comparator, which can simultaneously read two external voltages converted by the reference current Iref and the inductor current iL, or use an internal digital analog converter to control and simulate an actual voltage corresponding to the reference current Iref, and the output of the comparator can be synchronized with the system clock through the duty cycle synchronization module 104.

Figure 6:
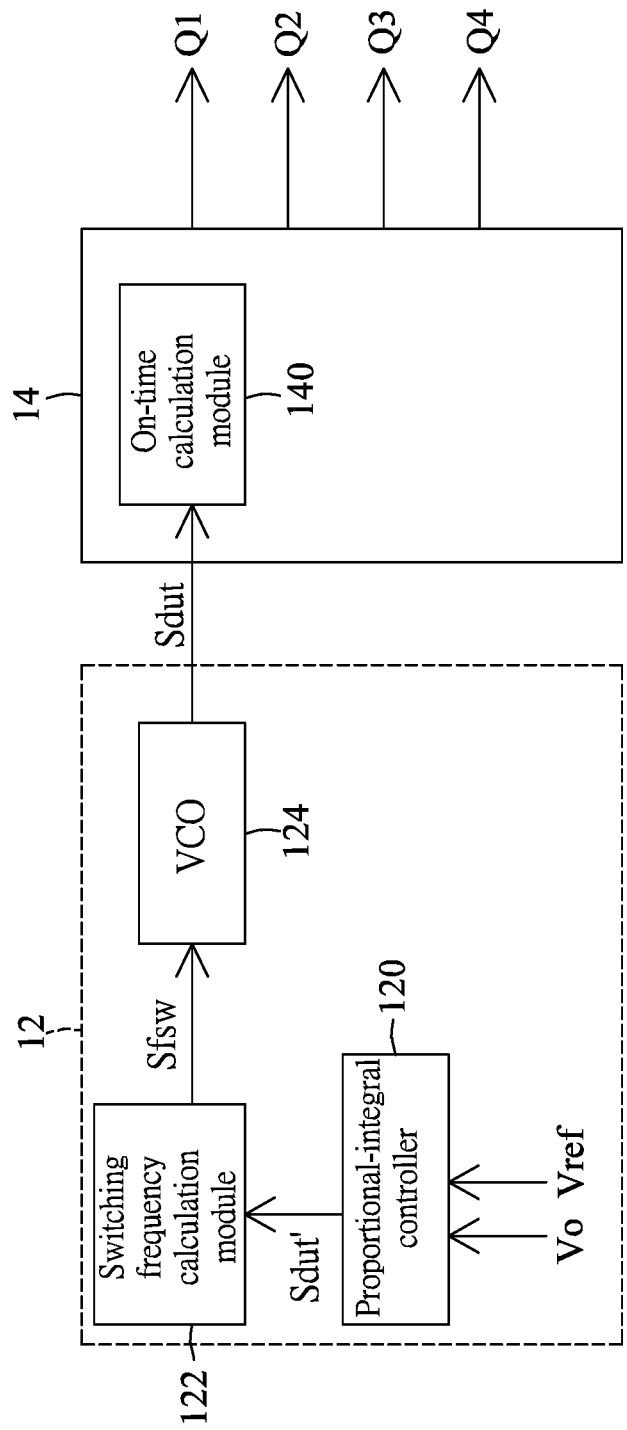
FIG. 6 is a circuit architecture diagram of a voltage detection circuit and a control circuit according to an embodiment of the present disclosure.

Reference is made to FIG. 6, which is a circuit architecture diagram of a voltage detection circuit and a control circuit according to an embodiment of the present disclosure. As shown in FIG. 6, the voltage detection circuit 12 can include a proportional-integral controller 120, a switching frequency calculation module 122, and a voltage-controlled oscillator (VCO) 124. The proportional-integral controller 120 is configured to receive the output voltage Vo and the reference voltage Vref, calculate an error between the output voltage Vo and the target output voltage, and generate a duty cycle indication signal Sdut 'according to the error. The target output voltage may be the same as the reference voltage Vref, or the reference voltage Vref may be amplified to the target output voltage by an internal amplifier, the present disclosure is not limited thereto.

In addition, the switching frequency calculation module 122 is configured to calculate a switching frequency according to the input voltage Vin, the output voltage Vo, and the duty cycle of the input power source Sin, and correspondingly generate a switching frequency indication signal Sfsw. The voltage-controlled oscillator 124 can receive the switching frequency indication signal Sfsw, and generate a corresponding duty cycle control signal Sdut according to the switching frequency indicated by the switching frequency indication signal Sfsw. The duty cycle synchronization module 124 can further receive the clamp signal Sr and the duty cycle control signal Sdut, and process them to output a synchronous clamp signal Sr 'synchronized with the duty cycle control signal to control the clamp switch Q5. In the CL-TCM current control method, in order to turn on the clamp switch Q5 in time and clamp the negative current at a fixed value, the above-mentioned voltage detection circuit 12 can be used in combination with the current detection circuit 10 to achieve the effect of immediate clamping.

Further, the control circuit 14 can include an on-time calculation module 140 configured to generate a plurality of control signals according to the duty cycle control signal Sdut to instruct the duty cycle to control the first switch Q1 to the fourth switch Q4, respectively. The control circuit 14 can store the control commands for controlling the first to fourth switches Q1 to Q4 to enter the first to eighth modes in a built-in memory to control the first to fourth switches Q1 to Q4 in response to different duty cycles.

In conclusion, the multi-level buck converter provided by the present disclosure can operate in a multi-level clamp switch triangular current mode. The converter uses two additional sets of switches and clamping capacitors to disperse the voltage stress of each of the switches, and the clamp triangle current mode control method can be used to reduce the effective value of the inductor current under light load conditions to improve the efficiency of the converter.

Furthermore, the multi-level buck converter provided by the present disclosure can reduce half of the voltage stress of the components through the multi-level architecture, and reduce the difficulty in selecting switches.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-level buck converter, comprising:
an input power;
an input capacitor connected in parallel with the input power with respect to a first node and a second node;
a first switch having one end connected to the first node;
a second switch having one end connected to another end of the first switch;
a third switch having one end connected to another end of the second switch;
a fourth switch connected between another end of the third switch and the second node;
a clamp capacitor connected between the another end of the first switch and the another end of the third switch;
an output inductor having one end connected to a third node between the second switch and the third switch, and another end connected to an output node;
a clamp switch having one end connected to the third node;
a clamp diode connected between another end of the clamp switch and the output node;
an output capacitor connected between the output node and the second node;
an output load connected between the output node and the second node, and connected in parallel with the output capacitor;
a current detection circuit configured to detect whether an inductor current of the output inductor exceeds a predetermined current value, wherein in response to the inductor current exceeding the predetermined current, the current detection circuit is configured to output a clamp signal to control the clamp switch to be turned on;
a voltage detection circuit configured to receive an output voltage and a reference voltage of the output node, and generate a duty cycle control signal according to an error between the output voltage and a target output voltage, wherein the duty cycle control signal is used to indicate a duty cycle; and
a control circuit configured to receive the duty cycle control signal and control the first switch to the fourth switch in a first part of the duty cycle to sequentially enter a first mode, a second mode, a third mode and a fourth mode,
wherein in the first mode, the control circuit is configured to control the first switch, the third switch to be turned on, and control the second switch and the fourth switch to be turned off;
wherein the control circuit is configured to, in response to entering the second mode from the first mode, control the first switch to be turned off;
wherein the control circuit is configured to, in response to entering the third mode from the second mode, control the fourth switch to be turned on;
wherein the control circuit is configured to, in response to entering the fourth mode from the third mode, control the third switch to be turned off; and
wherein the current detection circuit includes:
a current detection unit connected between the output inductor and the output node and configured to detect the inductor current; and
a comparator having a first input terminal for receiving the inductor current and a second input terminal for receiving a reference current, wherein the comparator is configured to compare the inductor current with the reference current to determine whether the inductor current exceeds a predetermined current value, wherein in response to the inductor current exceeding the predetermined current value, the comparator outputs the clamp signal at an output terminal of the comparator to control the clamp switch to be turned on.

2. The multi-level buck converter according to claim 1, wherein the control circuit is configured to control the first switch to the fourth switch in a second part of the duty cycle to sequentially enter a fifth mode, a sixth mode, a seventh mode and an eighth mode, and
wherein ON and OFF states of the first to the fourth switches in the first mode to the fourth mode are mutually exclusive with the ON and OFF states of the fifth mode to the eighth mode, respectively.

3. The multi-level buck converter according to claim 1, wherein the voltage detection circuit includes:
a proportional-integral controller configured to calculate the error between the output voltage and the target output voltage, and generate a duty cycle indication signal according to the error;
a switching frequency calculation module configured to calculate a switching frequency according to an input voltage, the output voltage, and the duty cycle of the input power source, and correspondingly generate a switching frequency indication signal; and
a voltage-controlled oscillator configured to receive the switching frequency indication signal to correspondingly generate the duty cycle control signal according to the switching frequency.

4. The multi-level buck converter according to claim 1, wherein the control circuit includes an on-time calculation module configured to generate a plurality of control signals to control the first to the fourth switches according to the duty cycle of the duty cycle control signal.

5. The multi-level buck converter according to claim 1, wherein the current detection unit is a Hall sensor.

6. The multi-level buck converter according to claim 5, wherein the current detection circuit further includes:
an analog-to-digital converter configured to convert the inductor current and the reference current into analog signals; and
a duty cycle synchronization module configured to receive and process the clamp signal and the duty cycle control signal, and output a synchronous clamp signal synchronized with the duty cycle control signal to control the clamp switch.

* * * * *